United States Patent
Elbe et al.

(10) Patent No.: US 7,428,651 B2
(45) Date of Patent: Sep. 23, 2008

(54) ELECTRONIC CIRCUIT WITH ASYNCHRONOUS CLOCKING OF PERIPHERAL UNITS

(75) Inventors: Astrid Elbe, Munich (DE); Norbert Janssen, Munich (DE); Holger Sedlak, Sauerlach (DE)

(73) Assignee: Infineon Technologies AG (DE)

( * ) Notice: Subject to any disclaimer, the term of this patent is extended or adjusted under 35 U.S.C. 154(b) by 346 days.

(21) Appl. No.: 10/723,432

(22) Filed: Nov. 25, 2003

(65) Prior Publication Data

US 2004/0139363 A1  Jul. 15, 2004

Related U.S. Application Data

(63) Continuation of application No. PCT/EP02/06147, filed on Jun. 4, 2002.

(30) Foreign Application Priority Data

Jun. 6, 2001 (DE) ................. 101 27 424

(51) Int. Cl.
*G06F 1/10* (2006.01)
*G06F 1/12* (2006.01)

(52) U.S. Cl. .............. 713/400; 713/187; 713/322

(58) Field of Classification Search ............ 713/400, 713/187, 322

See application file for complete search history.

(56) References Cited

U.S. PATENT DOCUMENTS

| | | | |
|---|---|---|---|
| 5,017,766 A * | 5/1991 | Tamada et al. | 235/492 |
| 5,569,903 A * | 10/1996 | Matsubara | 235/492 |
| 5,708,801 A * | 1/1998 | Williams et al. | 713/400 |
| 5,778,237 A * | 7/1998 | Yamamoto et al. | 713/322 |
| 5,951,661 A * | 9/1999 | Tavallaei et al. | 710/105 |
| 5,973,617 A * | 10/1999 | Reichmeyer et al. | 340/825.71 |
| 6,101,255 A | 8/2000 | Harrison et al. | |
| 6,115,823 A | 9/2000 | Velasco et al. | |
| 6,175,280 B1 * | 1/2001 | Lloyd et al. | 331/1 R |
| 6,263,390 B1 * | 7/2001 | Alasti et al. | 710/308 |
| 6,378,072 B1 * | 4/2002 | Collins et al. | 713/187 |
| 6,470,393 B1 * | 10/2002 | Heinrich et al. | 709/238 |
| 6,510,473 B1 * | 1/2003 | Voit | 710/58 |
| 2002/0073316 A1 * | 6/2002 | Collins et al. | 713/174 |
| 2003/0024984 A1 * | 2/2003 | Yamasaki | 235/451 |
| 2003/0149825 A1 * | 8/2003 | Allen et al. | 710/306 |

FOREIGN PATENT DOCUMENTS

| | | | |
|---|---|---|---|
| EP | 0217486 | * | 8/1987 |
| EP | 0 569 131 A2 | | 11/1993 |
| JP | 2-090382 A | | 3/1990 |
| JP | 2001022692 A | | 1/2001 |

\* cited by examiner

*Primary Examiner*—Nitin C. Patel
*Assistant Examiner*—Fahmida Rahman
(74) *Attorney, Agent, or Firm*—Dickstein, Shapiro, LLP.

(57) ABSTRACT

An inventive electronic circuit includes central processing means having a clock connection and a data connection, as well as a peripheral unit having a clock connection and a data connection, the clock connection of the peripheral unit being connected to a signal output of a controllable oscillator or to an external clock input. Synchronization means having a first and a second data connection is connected, the first data connection being connected to the data connection of the peripheral unit. In addition a data bus connects the data connection of the CPU and the second data connection of the synchronization means. The clocking of the peripheral unit asynchronous to the central processing unit yields a more effective operation being better adjustable to certain parameters, such as, for example, the application and the energy of the electronic circuit available.

11 Claims, 6 Drawing Sheets

ELECTRONIC CIRCUIT WITH ASYNCHRONOUS CLOCKING OF PERIPHERAL UNITS

This application is a Continuation of International Patent Application Serial No. PCT/EP02/06147, filed Jun. 4, 2002, which published in German on Dec. 12, 2002 as WO 02/099664 A1.

BACKGROUND OF THE INVENTION

1. Field of the Invention

The present invention relates to electronic circuits and in particular to electronic circuits in which a central processing unit (CPU) and at least a peripheral unit are used, as is, for example, the case in cryptography controllers.

2. Description of Prior Art

With the increasing use of cashless money transfer, electronic data transmission via public networks and the exchange of credit card numbers via public networks, the demand for cryptography algorithms increases to be able to perform digital signatures, authentifications or encrypting tasks. Well-known cryptography algorithms include asymmetrical encrypting algorithms, such as, for example, the RSA algorithm or processes basing on elliptical curves, or symmetrical encrypting processes, such as, for example, encrypting processes according to the DES or AES standards.

In order to be able to perform the computations specified by the cryptography algorithms with an acceptable speed in everyday life, cryptography controllers specially provided are used. Such cryptography controllers are, for example, used in chip cards, such as, for example, SIM cards or signature cards, for example, for paying by one's mobile phone, for home banking transactions or legally binding electronic signatures. Alternatively, cryptography controllers in computers or servers are used as a safety IC to perform an authentification or to be able to accept encrypting tasks which can, for example, be the safe transmission of credit card numbers, the transmission of emails having confidential contents and the safe cashless money transfer via the Internet.

High demands are made on the cryptography controllers in order for them to satisfy the high demands of users and to be able to establish themselves on the market. In order to be able to guarantee a high algorithmic safety, cryptography controllers must, for example, provide a considerable computing power. The reason for this is that the safety of many cryptographical algorithms, such as, for example, the well-known RSA algorithms, crucially depends on the bit length of the key used, and that consequently the cryptography controllers performing the corresponding cryptography algorithms must be able to cope with numbers of the largest possible length. In the RSA algorithm, for example, key bit lengths of 1,024 bits or sometimes even 2,048 bits have prevailed, present general-purpose processors in comparison operating with 8 bit, 32 bit or 64 bit numbers.

In addition cryptography controllers must comprise a high computing power to be able to perform the computations required for the respective cryptographic algorithm in an appropriate time. Thus it would, for example, be unacceptable for a user to have to wait several minutes for an authentification check or a payment transaction. To achieve high computing powers of this type, well-known cryptography controllers process many computing operations to be performed in parallel to increase the computing speed.

In the usage of cryptography controllers in chip cards, such as, for example, SIM cards or signature cards, an additional problem arises from the fact that they have to be produced cheaply as a mass product. Although they have to process computing-intense algorithms in the shortest time possible, the electronic circuit must not be costly and expensive.

In addition only a restricted amount of energy is available to cryptography controllers so that an additional restriction regarding the circuit effort is thus imposed on the controller design. Terminals for chip cards with contacts, for example, provide a maximum current of 30 mA, wherein in contactless applications and mobile applications, such as, for example, a SIM card in a cell phone, the current may be restricted to less than 10 mA. Consequently the computing speed of the coprocessors is restricted on the one hand by the production cost and on the other hand by the energy available.

A further problem in the design of cryptography controllers arises from the coexistence of many generally conventional cryptography algorithms. In the case of a chip card, for example, that cryptography controller being able to perform the most conventional cryptography algorithms and thus having a broad applicability and a high user-friendliness will establish itself on the market. Such a "multifunctional" cryptography controller, for example, prevents a user from having to carry several chip cards, of which each is provided for a special application or a special cryptography process, respectively. Due to the versatile use, such a multifunctional cryptography controller, however, must be able to perform a variety of computing operations being used by the many cryptographical algorithms, which leads to an increase in complexity or a reduction of the speed of the electronic circuit.

A possible design for a cryptography controller having a high multi-functionality on the one hand and a high processing speed on the other hand consists of an arrangement of a central processing unit and one or several coprocessors operating in parallel, as is, for example, the case in modern personal computers but also in modern graphics cards. An example of a block diagram of such a cryptography controller is shown in FIG. 6. A chip 900 includes a CPU (central processing unit) 910 and several coprocessors 920a and 920b, wherein for reasons of simplification only two coprocessors are shown in FIG. 6. The data connections 930, 940a and 940b of the CPU 910 and of the coprocessors 920a and 920b are connected to one another by a data bus 950. The CPU 910 further includes a data connection 960 being connectable to an external data bus via a connection device 970. In addition the CPU 910 includes a clock connection 980 connected to a clock connection device 1000 via a PLL 990 to receive an external clock signal.

Although the cryptography controller of FIG. 6, by providing several coprocessors 920a and 920b, is suitable for performing various tasks, such as various encrypting algorithms, and for performing computing operations in parallel, one problem of this arrangement is that the entire circuit 900 is clocked by a single external clock signal 1000 and that the PLL 990 consequently is only provided as a clock multiplier for the entire chip 900. IN this circuit it is thus, for example, not possible to clock the CPU 910 and the coprocessors 920a and 920b with different clock frequencies to tune the different computing times required for the tasks to be computed by the coprocessors 920a and 920b to one another by different clock frequencies.

In the design of a chip 900 in CMOS technology, the problem is additionally aggravated by the fact that the power consumption in this case depends on the clock frequency or the switching frequency of the MOSFETs, respectively. If thus some coprocessors are clocked faster than required, more current than necessary will be consumed.

A possible improvement of the cryptography controller design in FIG. 6 is to provide a clock divider for each coprocessor apart from the clock multiplier for the whole chip. A block diagram of such a cryptography controller is shown in FIG. 7, wherein in FIG. 7 equal reference numbers are associated to elements identical to those of FIG. 6. As can be seen, a clock divider 1010a and 1010b is connected between each coprocessor 920a and 920b and the data bus 950, wherein the clock divider is to make it possible that the coprocessors 920a and 920b can be clocked by a certain multiple of the PLL clock. By providing the clock dividers 1010a and 1010b it is thus possible to clock the coprocessors 920a and 920b independent of each other by different multiples of the clock of the CPU 910. In this manner a slowing down of the clock frequency for such coprocessors is enabled, the computation of which either requires less time or the result of which is only required at a later time.

A disadvantage of the circuit 901 of FIG. 7 is that the coprocessors 920a and 920b can only be clocked synchronously by a certain multiple of the clock of the PLL 990. This synchronous clocking with only multiples of the PLL clock on the one hand prevents the necessity of an artificial synchronizing of the coprocessors 920a and 920b but on the other hand also prevents the setting of the clock frequencies of the coprocessor 920a and 920b to clock frequencies not being multiples. In particular it is not possible to clock one or more of the coprocessors 920a and 920b with a clock frequency being faster than the clock frequency of the CPU 910 by another factor than an integer factor, to be, for example, able to perform a very computing-intense modular multiplication faster.

SUMMARY OF THE INVENTION

It is the object of the present invention to provide an electronic circuit and a method for controlling it so that the electronic circuit operates more effectively.

In accordance with a first aspect of the invention, this object is achieved by an electronic circuit comprising: a central processing unit having a clock connection for receiving a first clock and a data connection; a peripheral unit having a clock connection and a data connection, said clock connection being connected to a signal output of a controllable oscillator or to an external clock input, so that the peripheral unit receives a second clock which is relatively prime with respect to the first clock and whose clock frequency has no common divisor with the first clock; synchronization means comprising a first and a second data connection, said first data connection being connected to said data connection of said peripheral unit; and a data bus being connected to said data connection of said central processing unit and to said second data connection of said synchronization means.

In accordance with a second aspect of the invention, this object is achieved by a method of controlling an electronic circuit having a central processing unit and a peripheral unit being connected to each other via a data bus, comprising: clocking said central processing unit by a first clock; clocking said peripheral unit by a second clock which is different from the first clock, so that the clock frequency of the second clock is relatively prime with respect to the clock frequency of the first clock; and synchronizing data transmitted between said central processing unit and said peripheral unit via said data bus.

The present invention is based on the finding that by providing a separate clock, such as a separate oscillator or a separate external clock connection for the or more peripheral units it is possible to operate the peripheral unit actually asynchronous to the CPU or to operate same in such a way that the clock frequency of the CPU is independent of that of the peripheral unit. In this way it is made possible to adapt the clock frequency of the peripheral unit to the energy available, the task of the peripheral unit or the application present at this moment more precisely than only in certain integer multiples or fractions of the clock of CPU. Although the asynchronous operation of the peripheral unit requires an artificial synchronization of same, a faster operation of the electronic circuit is provided by the asynchronous clock frequency controlling, wherein the energy consumption is at the same time maintained at the same level. In particular, it is made possible by providing a separate controllable oscillator for the peripheral unit that the peripheral unit is clocked at a faster speed than the CPU and that thus very computing-intense operations, such as, for example, a modular multiplication, can even be performed faster that the CPU clock frequency.

According to an embodiment, the CPU, the peripheral unit, the synchronization means, the data bus and the oscillator are arranged on a common chip card, preferably even integrated into one chip, a controlling means being additionally provided to control the controllable oscillator depending on the energy available for the electronic circuit, depending on a task to be performed by the peripheral unit and/or depending on the present application of the electronic circuit.

If the inventive electronic circuit is embodied as a cryptography controller, the peripheral unit can, for example, be embodied as a coprocessor for one of a group of cryptographical algorithms including a symmetrical encrypting, such as, for example, the encrypting according to the DES or AES standard, or an asymmetrical encrypting, such as, for example, the RSA algorithm or an encrypting based on elliptical curves. Peripheral units in the sense of the present application, however, can additionally include an UART module (universal asynchronous receiver transmitter) for an exchange of data with a terminal, a sensor element for checking safety critical parameters, a random generator, a filter or the like. Preferable several cryptography controllers are provided, which can accept various tasks or carry out various cryptographical algorithms, respectively. By the inventive asynchronous clocking of the cryptography coprocessors it is in this case possible to adapt the operation of the cryptography controller as effectively as possible to the respective application by adjusting, for example, the clock frequencies of the coprocessors in such a way that the results of the different computations of the coprocessors are simultaneously present for a further use. It is in particular possible for a very time-consuming task of a cryptography processor to feed it with a faster clock than that of the CPU. All in all this leads to a cryptography controller leading to a higher market acceptance due its higher operation speed.

When an inventive electronic circuit is used as a cryptography controller on a chip card or a SIM card, due to the asynchronous clocking of the peripheral units, a further advantage over conventional designs results in that, due to the more precise adjustability of the peripheral unit clocks to clocks having no common devisor, it is possible to completely make use of the energy available which is scarce anyway. By this, in turn, the computing speed at a given energy provision, as is, for example, predetermined by a contactless terminal, can be improved. Contact terminals, for example, only provide a current of 30 mA, wherein in contactless terminals and mobile applications less than 10 mA are available, so that an optimum usage of the energy fed is of enormous importance. In addition the clock control for the peripheral units can be adjusted continually and optimally to the time variations of the energy provided by the terminal, these variations, for example, resulting from varying distances between terminal and chip card or from the varying state of charge of the battery of a mobile device, such as a cell phone, in which the chip card is used.

A further advantage of the present invention results from the fact that the clocking of the peripheral unit is independent of the clock of the CPU and that thus the design complexity is reduced since no electronic reactions on the CPU occur.

Further preferred designs and developments of the present invention result from the enclosed claims.

BRIEF DESCRIPTION OF THE DRAWINGS

Preferred embodiments of the present invention are subsequently detailed referring to the appended drawings in which.

DESCRIPTION OF A PREFERRED EMBODIMENT

Figure 1:
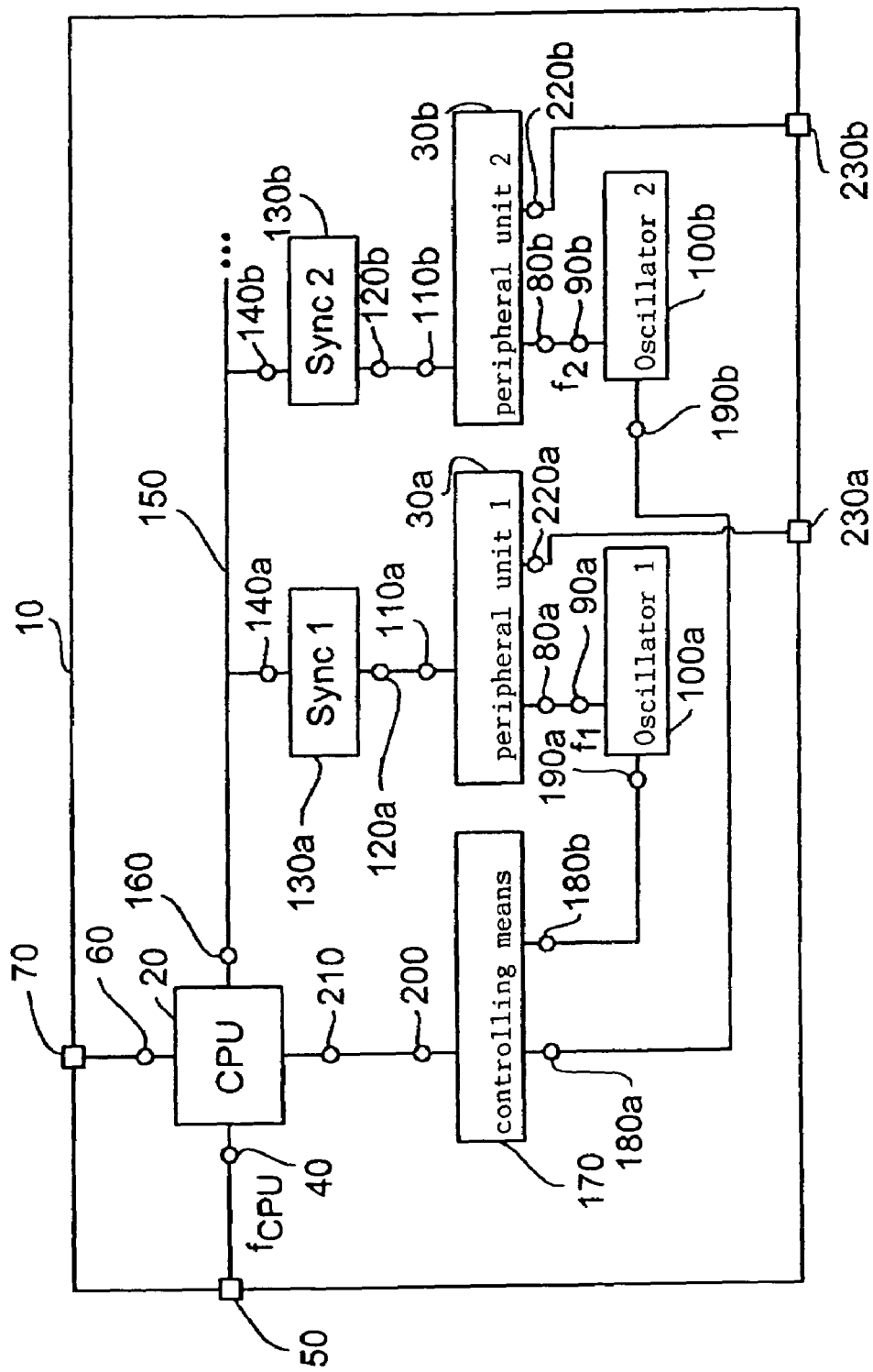
FIG. 1 shows a block diagram of a cryptography controller according to an embodiment of the present invention.

Referring to FIG. 1 the architecture of a cryptography controller according to an embodiment of the present invention is described at first. The cryptography controller 10 is integrated into an individual chip and includes a CPU 20 and a plurality of peripheral units 30a and 30b (in FIG. 1 only two of them are shown). The CPU 20 is connected to a connection device 50 via a clock connection 40 and to a connection device 70 of the chip 10 via a data connection 60. While the CPU 20 is fed with a clock frequency $f_{CPU}$ via the clock connection 40, the peripheral units 30a and 30b are connected to a signal output 90a, 90b of controllable oscillators 100a and 100b via a clock connection 80a, 80b to be fed by same with a clock of the frequency $f_1$ or $f_1$, respectively. A data connection 110a and 110b of the peripheral unit 30a and 30b is connected to a first data connection 120a or 120b, respectively, of a synchronization means 130a or 130b, respectively, for a clock synchronizing, a second data connection 140a, 140b, respectively, of the synchronization means 130a and 130b, for connecting to the CPU 20, being connected to a data bus 150 which is connected to a data connection 160 of the CPU 20. For controlling the oscillators 100a and 100b a controlling means 170 is provided comprising a plurality of control outputs 180a and 180b connected to respective control inputs 190a and 190b of the controllable oscillators 100a and 100b. The controlling means 170 is connected to a connection 210 of the CPU 20 via a connection 200 to obtain control parameters for controlling the oscillators 100a and 100b from the CPU 20.

As is shown in FIG. 1, alternatively or in addition to the clock connections 80a and 80b clock connection 220a and 220b of the peripheral unit 30a and 30b can be provided in another embodiment, these clock connections being connected to external clock inputs 230a and 230b to obtain externally fed independent clocks independently of one another, such as, for example, during the communication of the chip card with a terminal, so that the oscillators 100a and 100b need not be integrated into the controller 10. In the following description reference is made to the embodiment in which the oscillators 100a and 100b feed the independent clocks.

After the architecture of the cryptography controller 10 has been described before, the functioning of same will be described referring to an embodiment in which the cryptography controller 10 is integrated into a chip and arranged on a chip card located just inside a terminal (not shown). While the chip card is in the terminal, suitable contact connections of the terminal are in communication with the connection devices 50 and 70, the CPU 20 receiving an external clock signal with the clock frequency $f_{CPU}$ at its clock connection 40 and exchanges data, such as encrypted data, signatures, orders, etc., with the terminal via its data connection 60. The CPU 20 distributes orders to the peripheral units 30a 30b depending on the present application. The peripheral units 30a and 30b can, for example, be an UART module, a random number generator, a hash module or the like, or they are coprocessors, to which tasks or various cryptography algorithms are associated, such as, for example, asymmetrical encrypting processes, such as, for example, the RSA algorithm or an encrypting process basing on elliptical curves, or symmetrical encrypting processes, such as, for example, the encrypting process according to the DES or AES standards, or coprocessors for carrying out different partial operations of an arithmetic operation, such as a multiplication.

To obtain the most effective operation of the cryptography controller 10 in the special application, such as, for example, an RSA encrypting, the peripheral units 30a and 30b are each separated from the CPU 20 by a clock signal of a clock frequency $f_1$ or $f_2$, respectively, according to the invention, which is generated by the oscillators 100a and 100b. Adapting the clock frequencies $f_1$ or $f_2$ to the respective application or controlling the oscillators 100a and 100b, respectively, is performed by the controlling means 170 depending on certain control parameters. The controlling means 170, for example, receives the present application or the application of the cryptography controller 10, such as, for example, an RSA encrypting, as control parameters from the CPU 20 and according to this selects that cryptography coprocessors or peripheral units 30a and 30b with a high clock frequency, the computing power of which is at that moment required in the application. It can, for example, be advantageous to clock faster than the CPU 20 during a key exchange of an RSA coprocessor, during encrypting a DES coprocessor and during computing a hash value, a hash module or a hash coprocessor. As another control parameter the controlling means 170, for example, receives a value indicating the energy available for the cryptography controller 10, which it, for example, receives from a measuring point (not shown).

Controlling within the controlling means 170 can, for example, be performed by an access to a look up table in which a plurality of control signal values are saved for certain quantized control parameter combinations, which are then to be output to the oscillators 100a and 100b. Controlling within the controlling means 170 can, however, also be carried out by proportional regulators or the like to enable an essentially continuous regulation of the peripheral unit clocks. If thus the energy available for the cryptography controller 10 decreases, the controlling means 170 will correspondingly decrease the clock frequencies $f_1$ and $f_2$.

Figure 2:
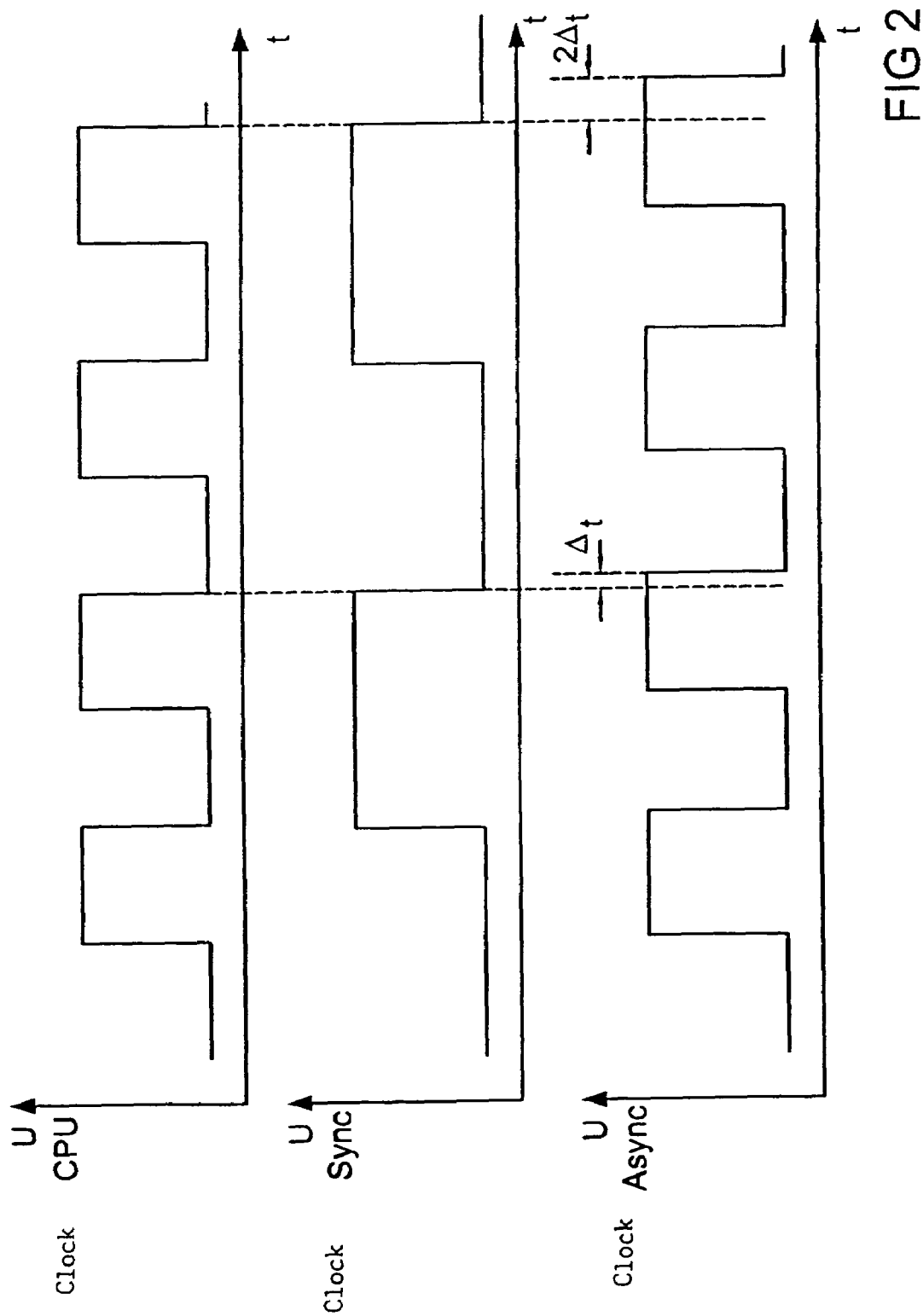
FIG. 2 shows different clock waveforms to clarify the asynchronous clocking of a peripheral unit.
Figure 7:
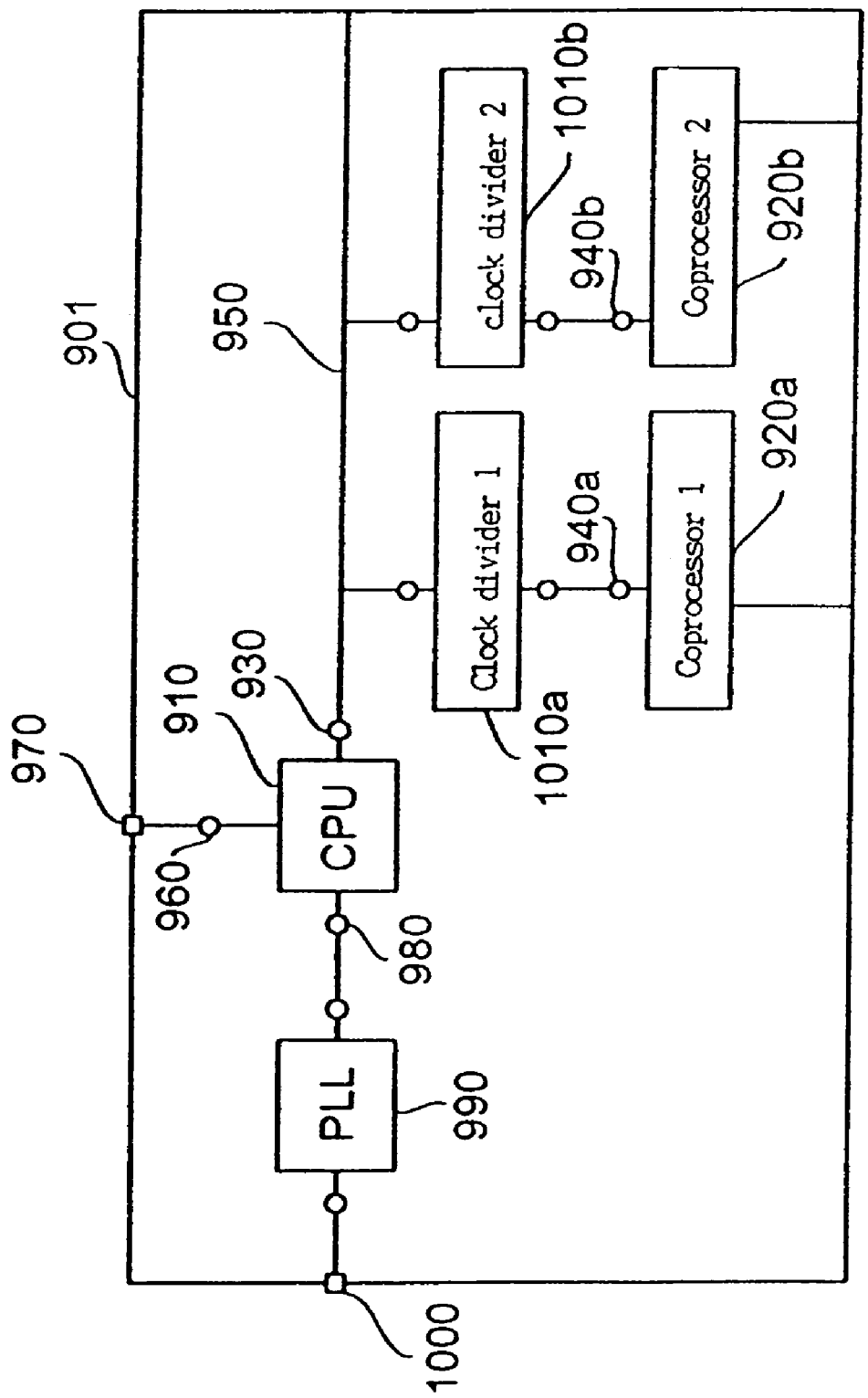
FIG. 7 shows a block diagram of a further conventional cryptography controller.

To illustrate the asynchronous clocking of the peripheral units in the cryptography controller 10 of FIG. 1 and the usability of same for an optimized operation of the cryptography controller 10, a clock waveform $T_{CPU}$ for the CPU and clock waveforms for one of the peripheral units of a cryptography controller of FIG. 7 and for one of the peripheral units of a cryptography controller of FIG. 1, i.e. clock$_{sync}$ or clock$_{async}$, are exemplarily illustrated in FIG. 2. As is illustrated in the figure by the dashed lines, the clock signal for a peripheral unit in the cryptography controller of FIG. 7 will always be synchronous to the clock signal of the CPU clock$_{CPU}$. The clock frequency of a peripheral unit of the conventional cryptography controller is always a certain multiple of the clock frequency of the CPU, the relation of the two clock frequencies in the present case being ½. In contrast the clock signal clock$_{async}$ of a peripheral unit of the cryptography controller of FIG. 1 is asynchronous to the clock signal of the CPU clock$_{CPU}$, wherein consequently arbitrary clock frequency relations can be adjusted. In particular the frequency of the CPU and the frequency of a peripheral unit can be adjusted to not having a common device. Thus it is made possible that the controlling means can adjust the optimum clock frequency relations more precisely than with a conditional clock frequency adjustment.

In particular, the computing speed can be optimized better with the same amount of energy available. In addition, unlike the frequency division, the adjustment of a faster clock frequency than that of the CPU is possible, whereby very computing-intense operations can be performed faster.

Figure 3:
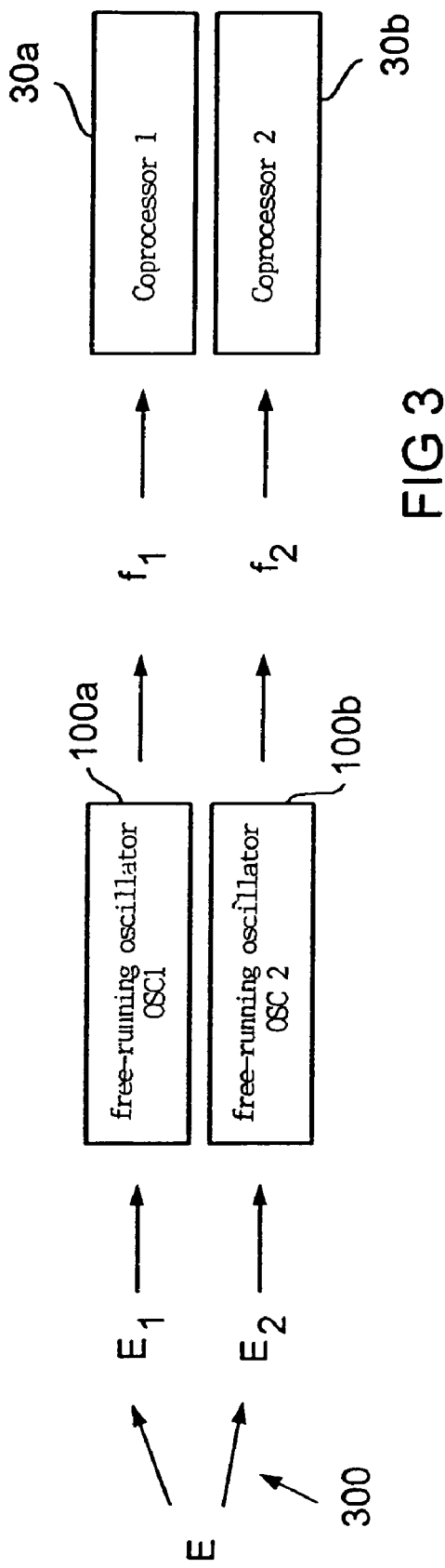
FIG. 3 shows a plot illustrating the distribution of the energy available to the peripheral units by adapting the peripheral unit clocks according to an embodiment of the present invention.

Referring to FIG. 3 the distribution of the energy E available to two peripheral units will be illustrated according to an embodiment of the present invention, this distribution being performed by the controlling means (FIG. 1). The controlling means receives the value of the energy E available and determines, depending on parameters, such as the present application of the cryptography controller 10 and the tasks of the peripheral unit 30a and 30b, the distribution of the energy available in energy portions $E_1$ and $E_2$, as is illustrated at 300, and, depending on these energy portions, adjusts the free-running oscillators 100a and 100b in such a way that they clock the peripheral unit 30a and 30b with clock frequencies $f_1$ and $f_2$ corresponding to the respective energy portions $E_1$ and $E_2$. Since, as has been described before, the clocking of the peripheral unit, according to the invention, can be performed independent of multiples of the CPU clock, an optimum usage of the energy E available is possible when the controlling means adjusts the clock frequencies $f_1$ and $f_2$ in such a way that the resulting energy portions $E_1$ and $E_2$ use up the energy E essentially completely ($E-E1-E2\approx 0$).

The relation between $E_1$ and $f_1$ or $E_2$ and $f_2$, respectively, can, for example, be determined in advance when designing the circuit to produce, depending on the energy available and the different applications possible both relating to an optimum energy distribution and relating to an optimum computing speed a look up table in which for different parameters and for different energies E available, optimum energy portions are stored, or to determine corresponding functional associations and implement them according to the circuit.

Figure 4:
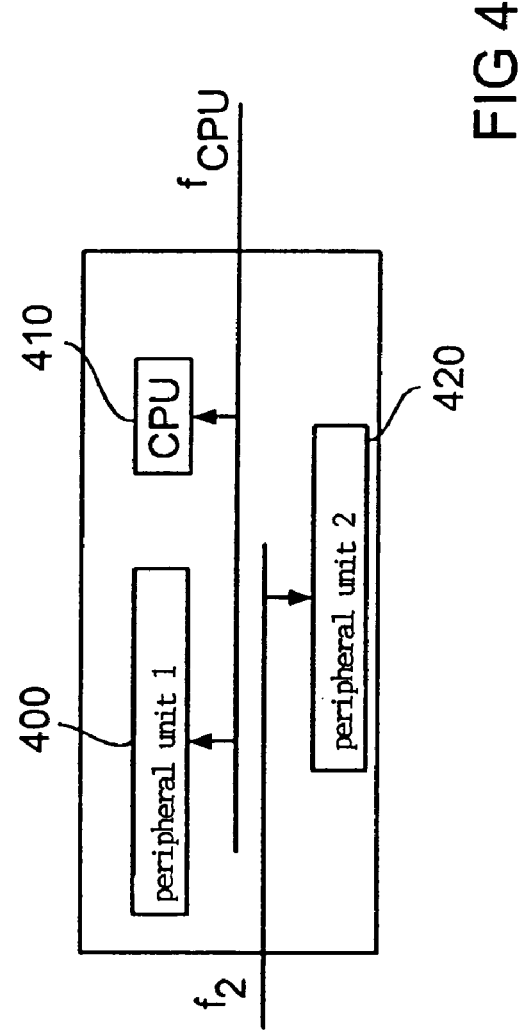
FIG. 4 shows a plot illustrating a clocking of peripheral units according to a further embodiment of the present invention.

In FIG. 4 an embodiment of a cryptography controller is illustrated very basically, in which a plurality of peripheral units in the cryptography controller do not comprise a separate oscillator, but is clocked with the same clock as the CPU (only one such peripheral unit is shown on behalf of them). As can be seen, both a peripheral unit 400 and a CPU 410 are clocked by a clock frequency $f_{CPU}$, while a peripheral unit 420 is clocked by a clock frequency $f_2$ asynchronous to the CPU clock. Even in this embodiment, the clock frequency $f_2$ can be adjusted to a more optimum extent by the asynchronous clocking of the peripheral unit 420 to achieve, for example, a best possible computing speed with the same amount of energy available.

After the inventive asynchronous clocking and its advantageous usage have been described generally, the advantageous application of same in a chip card used in terminals which feed same by a varying energy, such as, for example, contactless terminals and mobile devices, will be described. The energy being fed to the chip card by a contactless terminal or by the card reader of a mobile device is restricted to less than 10 mA. To make best use of the little energy available for the chip card or the electronic circuit, the controlling means controls the clock frequencies of the peripheral units in such a way that the energy available is completely distributed to the peripheral units (and the CPU). The controlling means controls the distribution relations according to further control parameters, such as, for example, the present application of the chip card and/or the tasks of the peripheral units. The optimum or complete usage of the energy available is, as has been described before, obtained by the asynchronous clocking of the peripheral units independent of the CPU clocking, since adjusting the clock frequencies of the peripheral units can be performed independently of multiples of the CPU clock.

In a simple case, for example, in which coprocessors are used sequentially, the controlling means could, for example, control the clock frequencies of the coprocessors in such a way that the coprocessors presently not used due to the present application are clocked slower or even switched off and that the coprocessor presently required by the application operates at the clock frequency resulting in a maximum energy usage for the whole chip card. In the special case of using the chip card in a contactless terminal thus an optimum and continuous adjustment to the varying energy resulting from distance variations between the chip card and the contactless terminal can be carried out by performing a direct tracking, independent of multiples of the CPU clock, of the clock frequency of the coprocessor presently required by the application. When the chip card is more remote from the terminal, less energy is available and the clock frequency is reduced while, when the chip card gets closer to the terminal, more energy is available and the coprocessor is clocked at a higher rate.

After describing the operating optimization by the asynchronous clocking of the peripheral units, the artificial synchronization of ingoing and outgoing data, such as, for example, orders, control signals, encrypted or unencrypted data or encrypting parameters, such as inputs and outputs (in FIG. 1 represented by a connection 110a or 110b, respectively), respectively, of the peripheral units 30a and 30b will be described, as is required by the asynchronous clocking. This artificial synchronization is performed by the synchronization means 130a and 130b. The synchronization means 130a or 130b, respectively, perform both the artificial synchronization of data transmitted on the bus 150 clocked with the clock frequency $f_{CPU}$ to the peripheral unit 30a or 30b and the artificial synchronization of data output by the peripheral unit 30a or 30b, respectively, to the bus 150. According to an embodiment, in an artificial synchronization of data from the data bus 150 to the peripheral units 30a and 30b two cases are to be distinguished, this distinction in the reverse case, that is the artificial synchronization of data to the data bus 150, being performed correspondingly. In the case of $f_{CPU} > f_i$ (i=1, 2), the data are at first written to a register of the synchronization means 130a or 130b with a frequency $f_{CPU}$ and then read from it with a clock frequency $f_i$. In the case of $f_{CPU} < f_i$, the data are either written and read via the register as well or are synchronized by a synchronizing circuit within the synchronization means 130a or 130b. The same measures are taken for the artificial synchronization of data from the peripheral unit 30a or 30b to the data bus 150.

Figure 5:
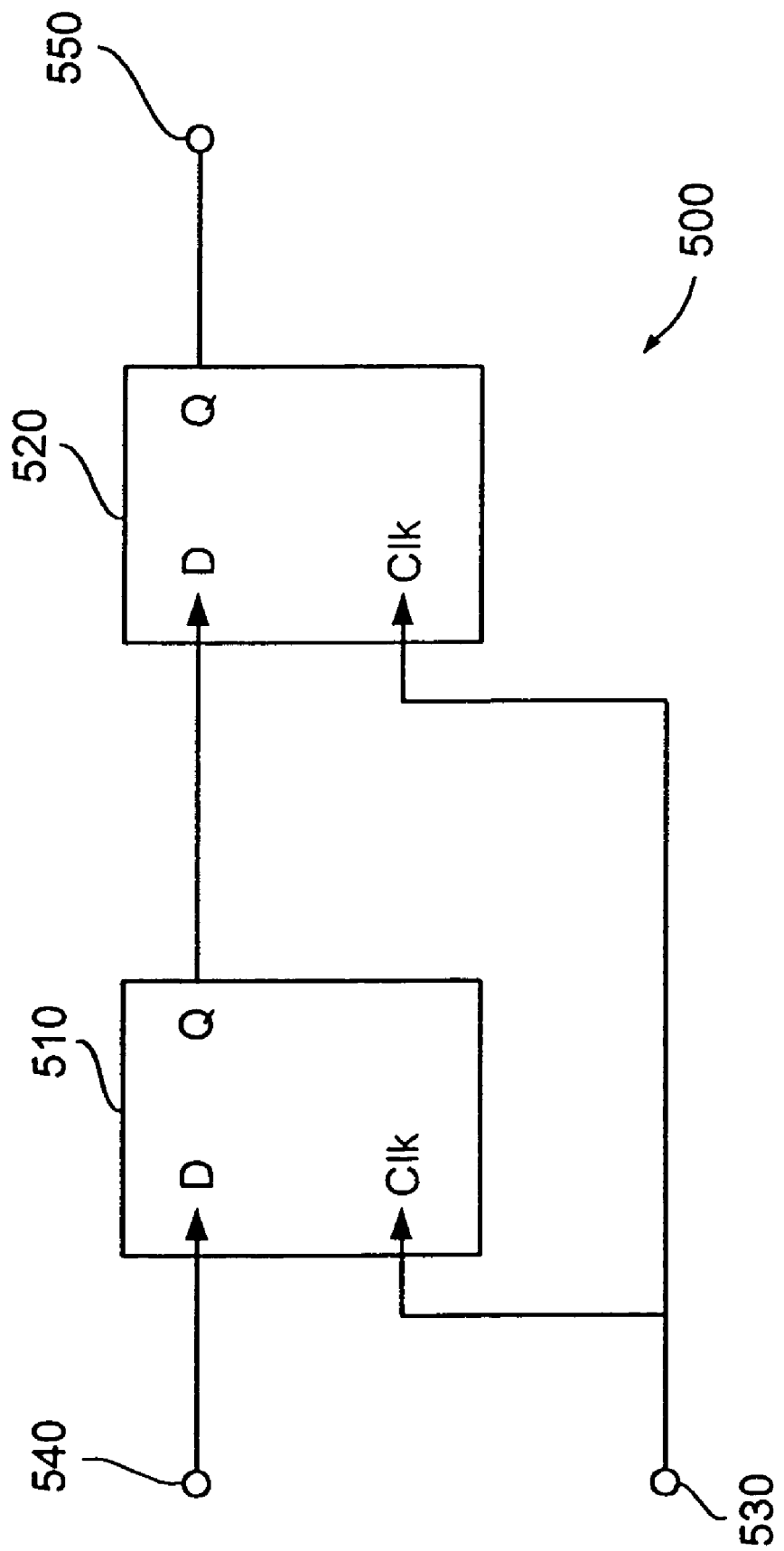
FIG. 5 shows a diagram of a synchronization means as can be used in the cryptography controller of FIG. 1, according to a further embodiment of the present invention.

A synchronizing circuit according to an embodiment of the present invention, as can be used in the synchronization means 130a or 130b, is shown in FIG. 5. The synchronization circuit 500 of FIG. 5 consists of two synchronization flip flop or D flip flops 510 and 520 connected in series, the clock input CLK of which is commonly connected to a clock connection 530 (not shown in FIG. 1) of the synchronization circuit 500. A D input of the flip flop 510 is connected to an input connection 540, a Q output of the flip flop 510 is connected to a D input of the flip flop 520 and a Q output of the flip flop 520 is connected to an output connection of the synchronization circuit 500. Depending on whether an artificial synchronization is performed from the data bus to a peripheral unit or vice versa, either a clock signal of the frequency $f_1$, data from the data bus 150 or data to the peripheral unit, respectively, or a clock signal of the clock frequency $f_{CPU}$, data from the peripheral unit or data to the data bus 150, respectively, are applied to the clock connection 530, the input connection 540 and the output connection 550.

The synchronization circuit 500 is constructed in such a way that the first flip flop 510 performs a sampling of data at the input connection 540, while the second flip flop 520 prevents meta-stable states forming when edges of data or control signals at the input connection 540 fall into the range of sample times of the flip flop 510, such as in the ranges of clock edges of the clock signal at the clock connection 540, from having a negative effect on the output data. A meta-stable state occurring at the output Q of the flip flop 510 will again be valid after a further clock of the clock signal at the clock connection 530, so that data output values always valid are output at the output Q of the flip flop 520.

Figure 6:
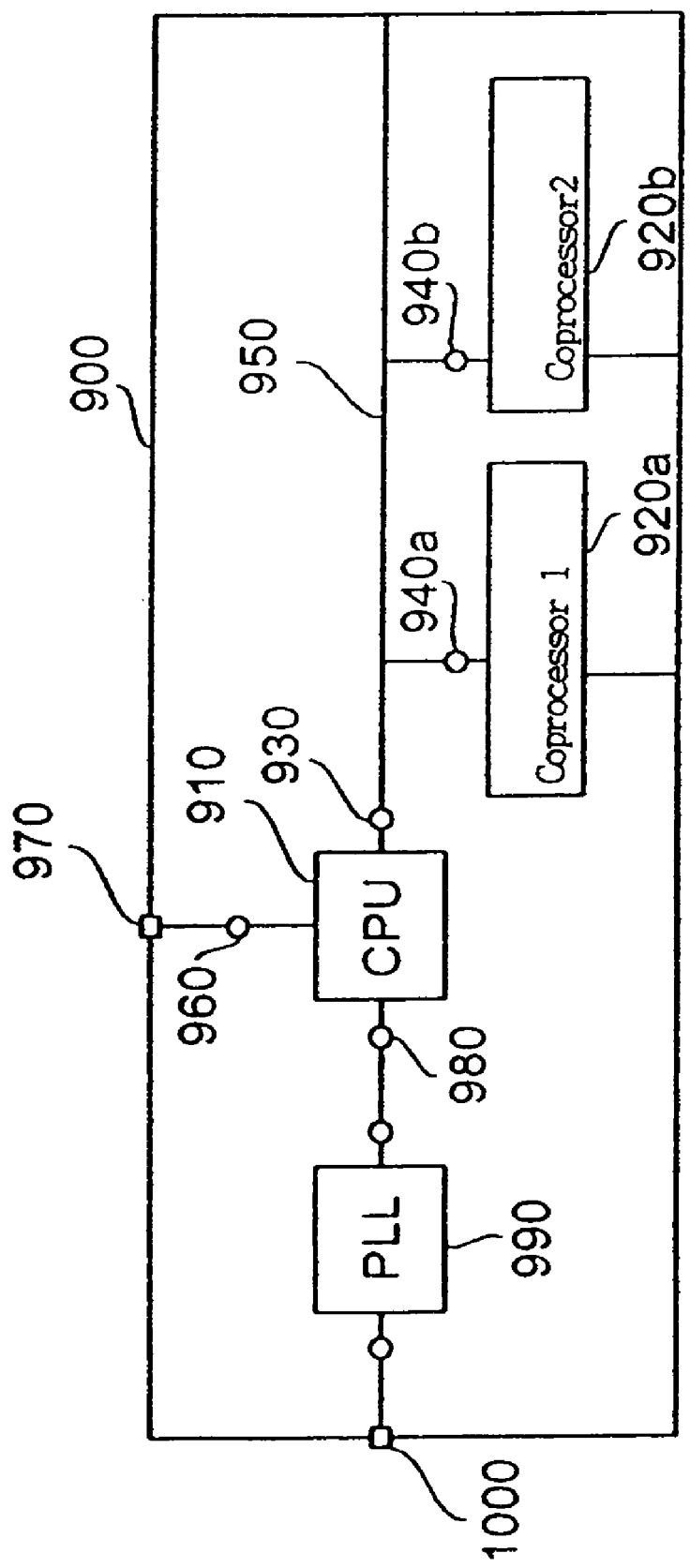
FIG. 6 shows a block diagram of a conventional cryptography controller.

It is pointed out that, although the above description has related to a cryptography controller, the present invention is further applicable to all other electronic circuits in which at least a central processing unit and a peripheral unit are provided. In addition the precise implementation of the electronic circuit is not restricted to an integrated circuit, but the electronic circuit can also be implemented on a board. The synchronization means can contain other synchronization circuits than those shown in FIG. 5. In addition the synchronization means can be included within a host interface of the peripheral units. It is further pointed out that like in the cryptography controllers of FIGS. 6 and 7, in the cryptography controller of FIG. 1 a PLL can be provided as a clock multiplier at the clock connection of the CPU to multiply the clock frequency of the externally fed clock.

It is further pointed out that it is not required for the present invention that the peripheral units are fixedly connected to the controllable oscillators. It is also feasible that controllable oscillators are provided in the terminal and that the clock connections of the peripheral units are connected to appropriate connection devices which in turn are connectable to appropriate contact connections at the terminal, at which the clock signal of the controllable oscillators is applied. In particular one contact connection each would be connected to the signal output of a controllable oscillator, while one connection device each would be connected to the clock connection of the peripheral unit or to the clock connection of the central processing unit, respectively. In this case a further contact connection at the terminal and a further connection device for transmitting control signals from the controlling means to the controllable oscillators would be provided would additionally be provided for each independent clock signal.

Referring to the above description it is pointed out that the connection devices can be adapted only to not the use in a contact terminal. They can also be adapted for a contactless energy absorption in contactless terminals, as has been described in the above description referring to the optimum energy usage.

Referring to FIG. 4 it is also pointed out that there are further possibilities to clock peripheral units according to the present invention. It is, for example, feasible, that a part of the peripheral units of the electronic circuit as in FIG. 7 is clocked via a clock divider with a clock derived from the clock of the CPU. It is also possible to form different asynchronous clock trees by linking a plurality of peripheral units to the asynchronous clock of a controllable oscillator, these peripheral units obtaining a clock derived from the asynchronous clock of the controllable oscillator via clock dividers. In this manner peripheral units, for example, operating together or in parallel with special applications could be clocked asynchronous as compared to the CPU, while they are clocked synchronous to one another with certain multiples of the common asynchronous clock.

What is claimed is:

1. An electronic circuit, comprising:
   a central processing unit having a clock connection for receiving a first clock and a data connection;
   a peripheral unit having a clock connection and a data connection;
   synchronization means comprising a first and a second data connection, said first data connection being connected to said data connection of said peripheral unit; and
   a data bus being connected to said data connection of said central processing unit and to said second data connection of said synchronization means,
   wherein said central processing unit, said peripheral unit, said synchronization means, said data bus and an oscillator are arranged on a common chip card, said clock connection of said peripheral unit is connected to said signal output of said controllable oscillator, said clock connection of said central processing unit is coupled to an external connection device being arranged to be connectable to a corresponding contact connection of a terminal, and said controllable oscillator being controlled independent from the first clock,
   a controlling means being arranged to control said controllable oscillator depending on energy available for said electronic circuit such that the energy available for said electronic circuit is distributed to the peripheral unit and the central processing unit, and a computing speed with the energy available for said electronic circuit is maximized.

2. The electronic circuit according to claims 1, wherein said central processing unit, said peripheral unit, said data bus, said controllable oscillator and said synchronization means are integrated into an integrated circuit.

3. The electronic circuit according to claim 1, further comprising:
   the controlling means having a control output, said control output being connected to said control input of said controllable oscillator, and said controlling means being arranged to control said controllable oscillator depending on a control parameter.

4. The electronic circuit according to claim 1, wherein said controllable oscillator is controllable to provide an output signal at a signal output, the frequency of which is faster than a frequency of a clock signal which can be fed to said clock connection of said central processing unit.

5. The electronic circuit according to claim 1, wherein said controllable oscillator is controllable to provide an output signal, the frequency of which has no common divisor with a frequency of a clock signal which can be fed to said clock connection of said central processing unit.

6. The electronic circuit according to claim 1, being embodied as a cryptography controller.

7. The electronic circuit according to claim 1, wherein said peripheral unit is one of a coprocessor for a cryptographic algorithm including an asymmetrical encrypting or a symmetrical encrypting, a hash module, or a random generator.

8. The electronic circuit according to claim 1, comprising a plurality of peripheral units, each peripheral unit being connectable to a separate controllable oscillator, or wherein clock signals with frequencies are fed to various of said plurality of peripheral units, these frequencies being derived from said controllable oscillator.

9. The electronic circuit according to claim 8, wherein a separate task is associated to each peripheral unit, the tasks being selected from a group including computing a modular multiplication, a modular addition, a hash value computation, an RSA encrypting, an encrypting based on elliptical curves, an encrypting according to the DES standard, a data exchange with a terminal, forming random numbers or checking safety-critical parameters.

10. The electronic circuit according to claim 1, wherein said clock connection is connected to the signal output of the controllable oscillator, so that the controllable oscillator clock is adjustable such that the controllable oscillator clock is—irrespective of the unit used for representing the frequencies of the first and the controllable oscillator clocks—relatively prime with respect to the first clock.

11. A method of controlling an electronic circuit having a central processing unit (CPU) and a peripheral unit being connected to each other via a data bus, wherein said central processing unit and said peripheral unit are arranged on a common chip card, comprising:

clocking said central processing unit by a first clock using an external connection device of the common chip card, being arranged to be connectable to a corresponding contact connection of a terminal;

clocking said peripheral unit by a second clock using a controllable oscillator of the electronic circuit, the controllable oscillator being controlled independent from the first clock;

synchronizing data transmitted between said central processing unit and said peripheral unit via said data bus; and controlling said controllable oscillator depending on energy available for said electronic circuit such that the energy available for said electronic circuit is distributed to the peripheral unit and the central processing unit, and a computing speed with the energy available for said electronic circuit is maximized.

* * * * *

UNITED STATES PATENT AND TRADEMARK OFFICE
CERTIFICATE OF CORRECTION

PATENT NO. : 7,428,651 B2  Page 1 of 1
APPLICATION NO. : 10/723432
DATED : September 23, 2008
INVENTOR(S) : Astrid Elbe et al.

It is certified that error appears in the above-identified patent and that said Letters Patent is hereby corrected as shown below:

Claim 2, col. 10, line 54, change "claims 1" to -- claim 1 --;

Claim 3, col. 10, line 60, delete "the";

Claim 10, col. 12, line 1, change "controllable oscillator" to -- second --;

Claim 10, col. 12, line 2, change "controllable oscillator" to -- second --; and Claim 10, col. 12, line 4, change "controllable oscillator" to -- second --.

Signed and Sealed this

Twenty-fourth Day of February, 2009

JOHN DOLL
*Acting Director of the United States Patent and Trademark Office*